(12) United States Patent
Cox et al.

(10) Patent No.: US 9,612,802 B1
(45) Date of Patent: Apr. 4, 2017

(54) CONTEXTUAL INTERACTIVE PROGRAM FEEDBACK

(71) Applicant: EMC Corporation, Hopkinton, MA (US)

(72) Inventors: Timothy J. Cox, Mendon, MA (US); Scott Joyce, Foxboro, MA (US); Donald Labaj, Northborough, MA (US)

(73) Assignee: EMC CORPORATION, Hopkinton, MA (US)

( * ) Notice: Subject to any disclaimer, the term of this patent is extended or adjusted under 35 U.S.C. 154(b) by 299 days.

(21) Appl. No.: 14/039,684

(22) Filed: Sep. 27, 2013

(51) Int. Cl.
*G06F 9/44* (2006.01)

(52) U.S. Cl.
CPC .................................... *G06F 8/20* (2013.01)

(58) Field of Classification Search
None
See application file for complete search history.

(56) References Cited

U.S. PATENT DOCUMENTS

| | | | |
|---|---|---|---|
| 6,516,421 B1* | 2/2003 | Peters | H04W 52/027 713/320 |
| 7,444,340 B2* | 10/2008 | Padgett | |
| 7,996,338 B2* | 8/2011 | Kamar | G06Q 10/109 706/11 |
| 8,032,480 B2* | 10/2011 | Pinckney | G06N 99/005 706/45 |
| 8,635,475 B2* | 1/2014 | Lin | G06F 1/3215 713/300 |
| 2004/0002993 A1* | 1/2004 | Toussaint et al. | 707/104.1 |
| 2006/0026536 A1* | 2/2006 | Hotelling et al. | 715/863 |
| 2007/0050654 A1* | 3/2007 | Switzer | G06F 1/3203 713/320 |
| 2010/0229112 A1* | 9/2010 | Ergan | G06F 3/04895 715/764 |
| 2011/0060754 A1* | 3/2011 | Theimer et al. | 707/769 |
| 2011/0279453 A1* | 11/2011 | Murphy et al. | 345/420 |
| 2012/0242482 A1* | 9/2012 | Elumalai | G06Q 10/109 340/539.13 |
| 2012/0311465 A1* | 12/2012 | Nealer | H04L 29/06 715/760 |
| 2012/0317545 A1* | 12/2012 | Chandra et al. | 717/110 |
| 2013/0132565 A1* | 5/2013 | Cetin | H04L 65/40 709/224 |
| 2014/0013234 A1* | 1/2014 | Beveridge et al. | 715/740 |
| 2014/0130099 A1* | 5/2014 | Kunisetty | 725/50 |
| 2014/0171039 A1* | 6/2014 | Bjontegard | H04L 29/06034 455/414.1 |
| 2014/0365397 A1* | 12/2014 | Mitra | G06Q 30/0282 705/347 |

* cited by examiner

*Primary Examiner* — Insun Kang
(74) *Attorney, Agent, or Firm* — Barta, Jones & Foley, PC (57) ABSTRACT

The subject disclosure is directed towards collecting feedback from users of a program in the current context in which the user is interacting with a part of the program. The collected feedback is thus likely relevant to that part of the program. By associating the collected feedback with metadata that corresponds to the context of the program at the current program location of collection, more meaningful, useful data is obtainable for improving an existing program, developing new programs, debugging and so forth.

20 Claims, 7 Drawing Sheets

CONTEXTUAL INTERACTIVE PROGRAM FEEDBACK

BACKGROUND

Users that interact with software programs sometimes provide feedback as to the user experience with (at least parts of) those programs. Program developers/authors use the feedback to simplify existing products as well as create easy-to-use, more intuitive new software products.

Existing feedback collection mechanisms suffer from a number of problems, which makes collecting useful feedback difficult. One cumbersome and fairly manual way to collect feedback is to conduct usability tests in which a usability engineer steers, directs and watches a test subject perform scripted tasks. The engineer manually collects information from this session. As can be readily appreciated, this manual collection method is fairly limited and does not provide for real-world and/or unscripted usage scenarios.

In real-world scenarios, one problem is that many users do not know how to find the mechanism needed to return feedback, and thus do not provide any. Another problem results from users providing the feedback after interacting with the program. Sometimes such subsequent feedback may be very general ("took too long" or "was too complicated"), which is of almost no help in fixing any specific problem. Other times users may have difficulty with a particular part of the program, but then not accurately recall the specific issue or issues that caused the difficulties with respect to that part. Still other times, a user may struggle through a difficult part of a program, but after further interaction, have a different understanding as to the program, which biases the feedback returned, or influences the user to not bother sending any feedback.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing a feedback mechanism to users in a way that facilitates collection of feedback from users relevant to their current context (e.g., which part of the program corresponds to the feedback). The feedback mechanism is generally easy for users to find, and may appear at the appropriate places in the program.

In one aspect, an interactive feedback entry triggering mechanism (e.g., a feedback button or other interactive mechanism) may be made to appear at a relevant location so as to "prompt" the user as to the ability to enter any desired feedback. As determined by the program developer, for example, an interactive feedback entry triggering mechanism (for simplicity referred to as a "feedback mechanism" herein) may appear anywhere on a user interface, at any time, in any suitable presentation format (e.g., color) and/or according to any criteria; different feedback entry triggering mechanisms may appear on the same user interface at different locations.

It should be understood that any of the examples herein are non-limiting. For instance, examples used herein show wizards, pages, UI controls and the like, however any programs, input mechanisms and feedback-related mechanisms may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and collecting contextual user feedback in general.

Figure 1:
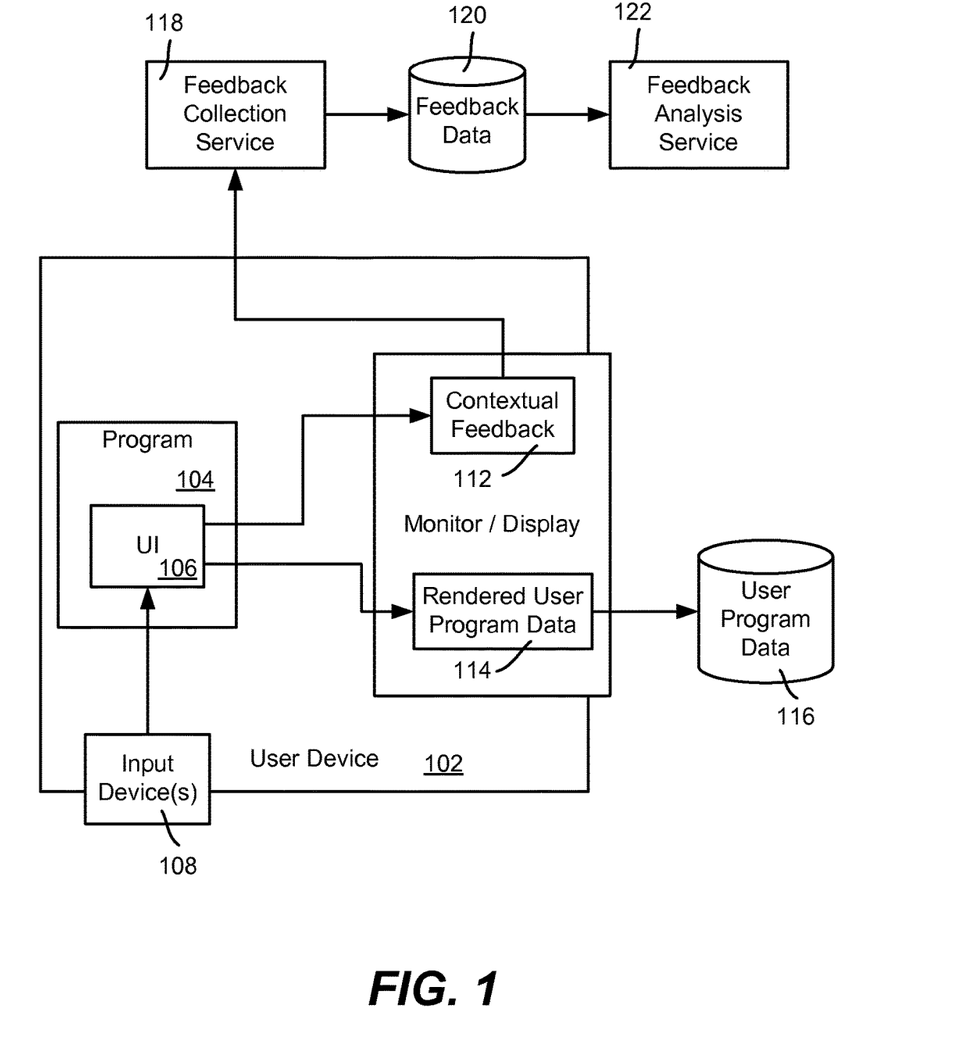
FIG. 1 is a block diagram showing various example components that may be used to collect feedback from a user in the context of a program, according to one or more example embodiments.

FIG. 1 shows a block diagram of an example user device 102 configured to run any number of programs, e.g., represented as the program 104 having a user interface (UI) 106. The device 102 may be a personal computer, workstation, mobile device such as a tablet or smartphone, and so on.

In general, the user interacts with the program 104 in a known manner via one or more input devices 108, which causes GUI output to be rendered to a device display or device-coupled monitor 110. As described herein, the output may include contextual (including user) feedback 112, as well as program data 114, such as entered via text, graphical input, controls of a page, a window, a menu and so forth. For purposes of brevity, wizard pages are generally exemplified herein, although it is understood that any visible content may be output, even if not technically a "page" of content. Similarly, any type of program, e.g., application, applet, middleware, operating system and the like that allows user interaction may benefit from the technology described herein.

As is typical, any rendered program data 114 that the user wants persisted is saved as user program data 116 in a suitable format. The data 116 may be persisted locally and/or remotely.

As described herein, any data that the user enters as feedback 112 may be persisted for further use, e.g., program development, modification (revising/debugging) and/or the like. As exemplified in FIG. 1, a feedback collection service 118 obtains the contextual feedback data 112 in any suitable way, such as via pull, push, email, instant messaging and/or the like. The feedback data 112 may be merged with that of other users (and other programs), and may be in any format, e.g., reformatted, compressed and so forth, as represented by feedback data 120. A feedback analysis service 122, which may include manual analysis, automated mining, automated analysis and so forth may use the feedback data 120 in any desired manner. As can be readily appreciated, a "service" or the like is only one example way to collect and/or process the contextual feedback data 112, and various other alternatives may be used for a like purpose.

Figure 2:
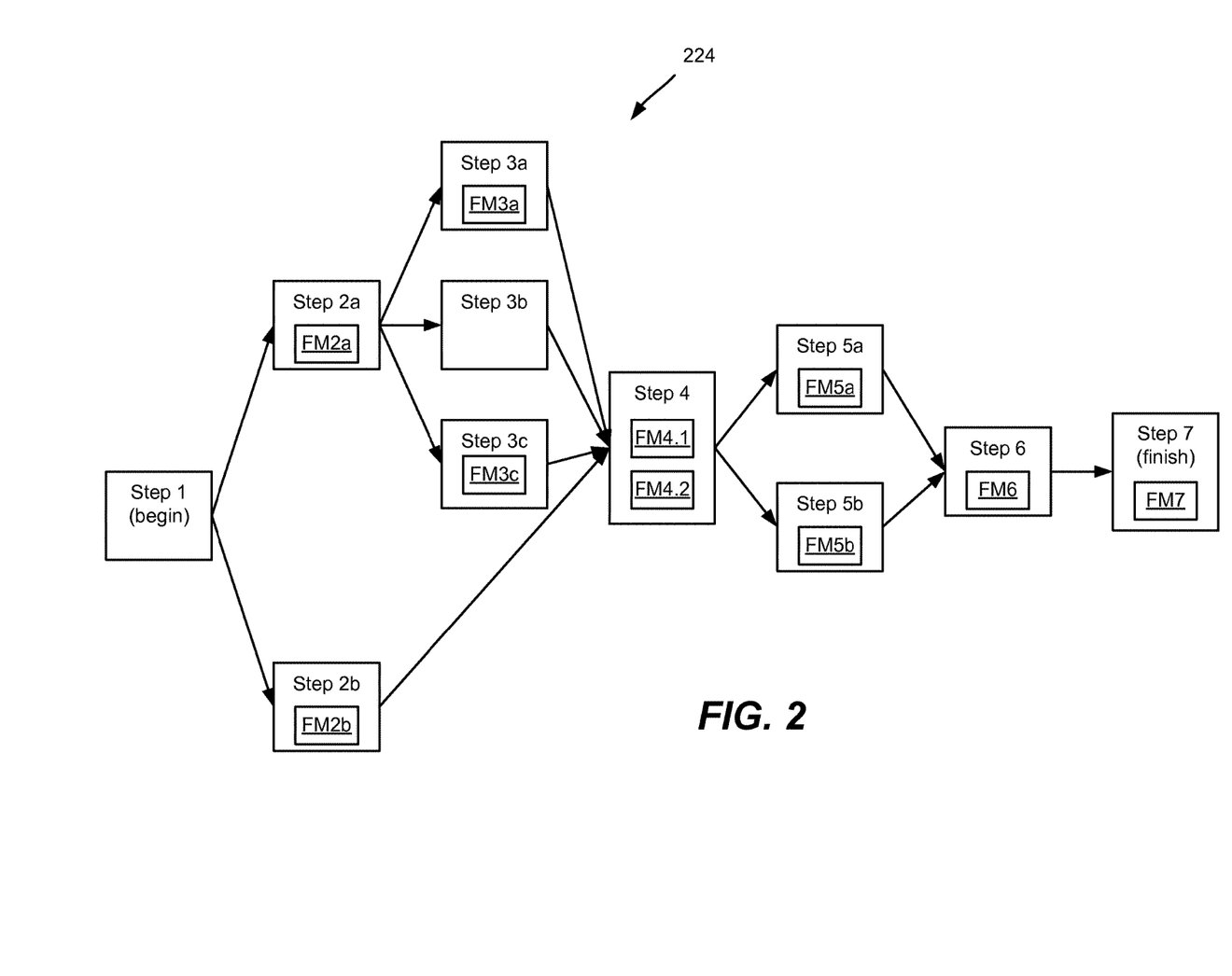
FIG. 2 is a representation of a set of screens such as of a program wizard including screens with feedback collection mechanisms according to one or more example embodiments.

FIG. 2 shows how a wizard 224 comprising pages between Step 1 and Step 7 may include feedback mechanisms FM2a through FM7. As is understood, the data entered at one page may determine the path taken through the wizard, e.g., Step 5a may be the selected screen if the user selects "Bank Account" to pay for an item, whereas Step 5b may be the selected screen for "Credit Card." Other programs that are not "wizards" may have similar paths through screens, which may include feedback mechanisms thereon.

For example, each feedback mechanism may be a button that appears at a time and location determined by a developer of the wizard (or per the page if developers provide pages independently, for example). As represented in FIG. 2, not every page needs a button, e.g., the page corresponding to Step 1 and the page corresponding to Step 3b each does not have a feedback mechanism. As also represented in FIG. 2, a page may have more than one feedback mechanism, e.g., the page corresponding to Step 4 has two feedback mechanisms FM4.1 and FM4.2.

As can be readily appreciated, an API or the like accessible via a development environment may assist developers in providing feedback mechanisms. The API or the like may take feedback mechanism-related parameters such as type, location, timing data, color data, other appearance data and so forth. Feedback collection for a program or subset of a program may be operated or not operated according to a mode, e.g., turned on for Beta versions off for released versions, turned on for certain customers while turned off for others, and so on.

Figure 3:
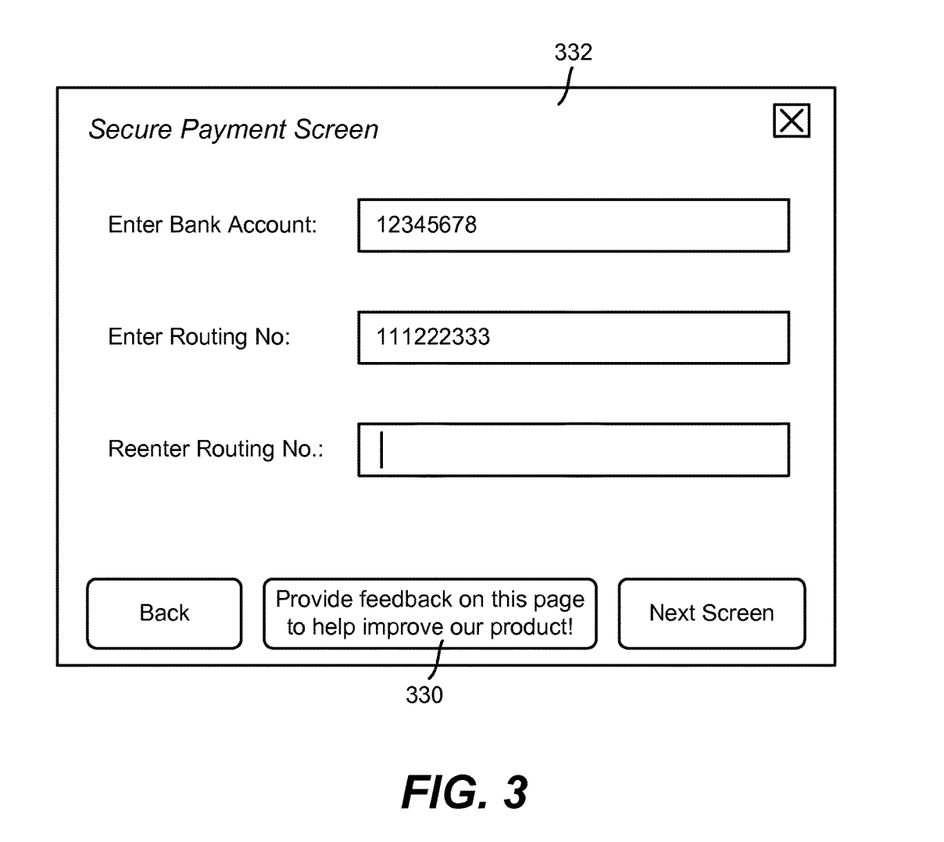
FIG. 3 is a representation of a feedback mechanism presented on a program user interface screen to collect contextual program feedback relative to that screen, according to one or more example embodiments.

FIG. 3 shows how a contextual feedback mechanism may be used. In FIG. 3, along with various input controls or the like, a button 330 requests feedback relative to the page 332. If the user selects the button 330, for example, a text entry or other collection mechanism appears, whereby the user may type or otherwise enter (e.g., speak) feedback.

The feedback that is collected may be uploaded along with context metadata that helps identify the point of collection and related state information. For example, a simple format may be (program ID, program context ID, feedback text), where program context ID may identify what step in the wizard was being presented at the time feedback was entered, and/or what feedback mechanism was triggered. A scheme as simple as (program, input field) such as ("server space provisioning wizard", "server input field") may suffice, although alphanumerical identifiers or the like may provide for more flexibility and extensibility. As another example scheme, each interactive feedback mechanism may have its own GUID or the like. Additional metadata regarding the feedback may be collected as well, such as such as current interactive control identifier, software revision/version number, user role, customer ID, license information, timestamp, system state, device type, display type, duration interacting with current screen and/or control, and so on; (note that a long duration time may be indicative of user difficulty with a screen or UI component on a screen). Virtually any information that may be collected from a device (or possibly along with other manual input) may be included as contextual metadata for the feedback data.

Figure 4A:
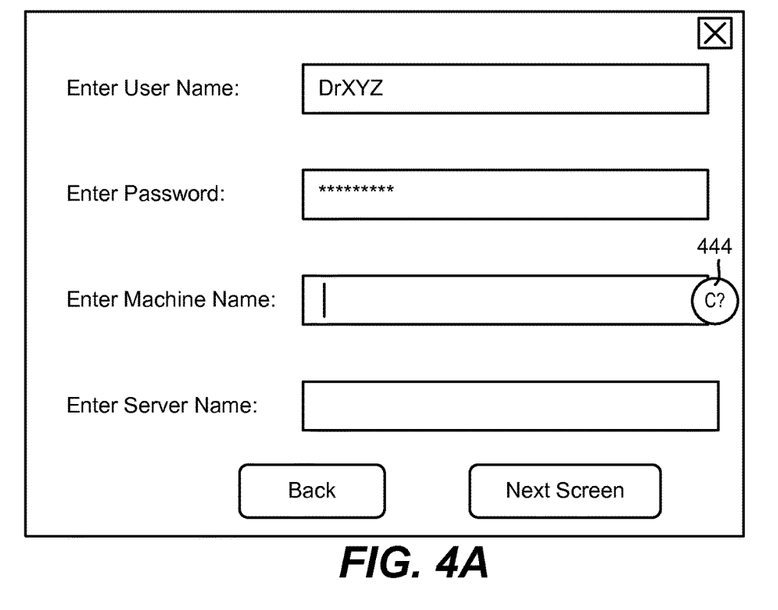
FIGS. 4A and 4B are representations of a user interface screen including feedback mechanisms for collecting contextual program feedback relative to separate input controls/fields of that screen, according to one or more example embodiments.
Figure 4B:
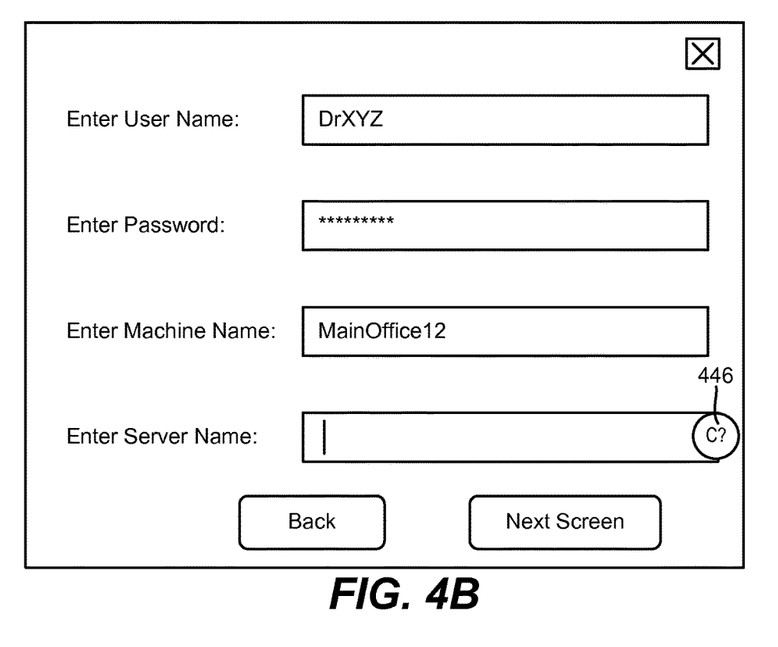

FIGS. 4A and 4B exemplify another model, in which feedback mechanisms 444 and 446, respectively, are in the form of icons/buttons that appear adjacent the field that currently has focus. Any text or other symbol(s) may appear in the button, e.g., in FIGS. 4A and 4B the feedback mechanisms 444 and 446 comprise icons labeled "C?" requesting "Comments" or the like. Interactions such as hovering over the icon with the pointer may provide information on what the meaning of the icon is (yet in general may be configured to stay out of the user's data entry). Among many possible alternatives, hovering links or the like that ask for "comments" and move with the current control (or field) with which the user is interacting may be provided instead of or in addition to such icons/buttons.

In such a scenario the metadata likely includes an identifier of which control was active at the time of comment entry. In this way, having icons or the like associated with a particular input field for example, provides for more granular feedback than that of an entire page (as previously exemplified in FIG. 3). Useful feedback such as "what server is meant here, the server I am provisioning space from or the one I'm working on?" or "took forever to find out the server name" is contextually relevant and can be matched via metadata to the precise point at which the user had difficulty.

Note that in FIGS. 4A and 4B, the feedback mechanisms 444 and/or 446 need not appear immediately (or at all in a given instance) unless and until deemed needed by the program. For example, if one user begins typing the machine name right away, it is likely that the user does not have any difficulty with this entry, and thus feedback need not be solicited from this user, whereby the feedback mechanism 444 need not be presented (or may be presented in a grayed out manner, or mostly transparent that grows less transparent over time). However, another user may take some time before entering any data, whereby after some threshold inactivity delay time (e.g., ten seconds) the feedback mechanism 444 may be presented to that user to solicit feedback. The feedback mechanism may change color, flash, be animated and so forth to draw more attention to it, e.g., as time increases without interaction.

Figure 5:
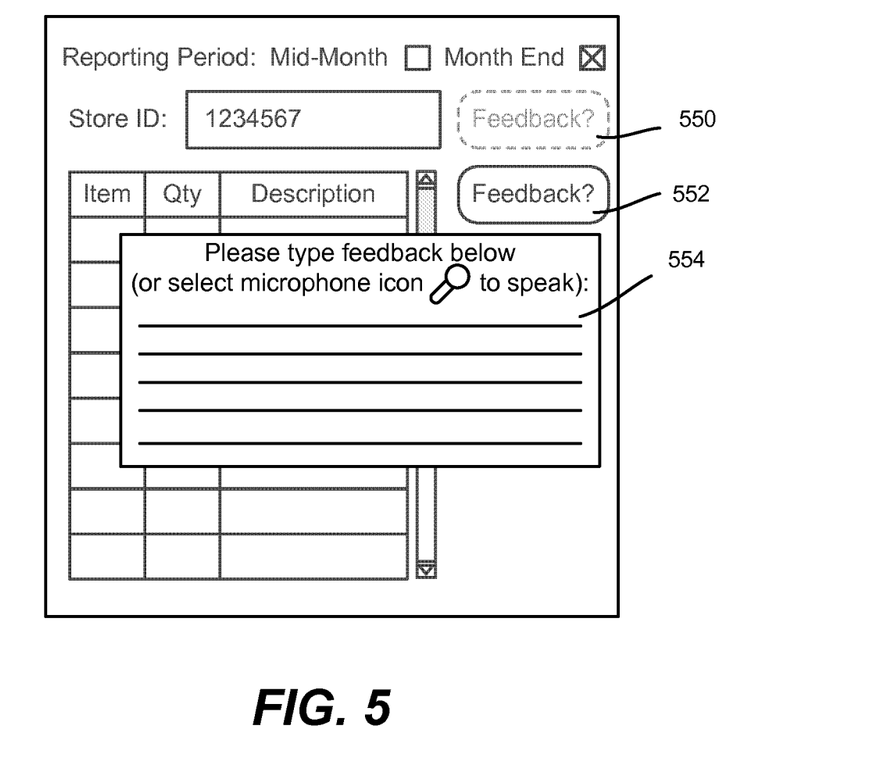
FIG. 5 is a representation of how feedback mechanisms presented on a program user interface screen may be triggered to collect contextual program feedback relative to an input entry field/control, according to one or more example embodiments.

FIG. 5 shows another alternative, in which a feedback mechanism 552 was active and actuated while the user was proximate a table entry control; the other (text box) feedback mechanism 550 may be grayed out, or disappear when the user is not actively interacting with its corresponding text box control. Note that the simple checkbox control (at the top of the program user interface screen) does not have an associated feedback mechanism because the developer deemed feedback for such a simple choice to be likely of little value.

When selected, a drop down interactive text entry box 554 appears for information entry to collect typed feedback in this current context. Audio recording/streaming to a server is also an option in this example. As can be seen, it is straightforward for a user to enter "just-in-time" feedback that is contextually relevant to the data that the user is entering or attempting to enter in this example and other examples. Video and other data such as gesture-related input data, screenshots, images and so on may be provided as feedback by the user, and any type of feedback data may be combined.

As can be readily appreciated, feedback mechanisms other than buttons or links may be used. For example, if a program is appropriately configured, a knowledgeable user may "right click" at a data entry control or field to enter feedback, possibly selecting a selection or a sub-selection from a drop-down menu of other right-click options such as "help" or the like. A program with without different data entry "screens" such as a word processing program, photo editor program, spreadsheet and so on may benefit from such a right-click mechanism, although any suitable mechanism(s) may be used, and any other program user interface screen, such as each drop-down menu, toolbar, ribbon or the like may include such a feedback mechanism or mechanisms. Another feedback mechanism may incorporate a simple voting scheme such as thumbs up or thumbs down, or thumbs up, thumbs down or confused, or green checkmark, red "X" or yellow "?" options are all possible examples of a voting type scheme; checkbox-related data, vote-related data, radio-button related data and the like may be used for vote-related data, for example. Actual physical gestures may be prompted for in systems configured with gesture recognition.

Returning to FIG. 2, note that in Step 7, the "finish" page of the wizard, a feedback mechanism FM7 is shown as provided to collect feedback. Such a page may not request any new data entry for that page, but instead, for example, summarize the data the user entered and request feedback regarding what the user experienced as a whole. A prompt for general program feedback relevant to the program in general or any part thereof may be appropriate at such a screen. Note that while a general goal of collecting post-program completion feedback may be somewhat similar to collecting other post-program completion feedback, in contrast the exemplified feedback mechanism FM7 at the end of the program is easy to find, and can prompt with relevant text (that is different from other contextual feedback mechanisms of earlier screens).

Figure 6:
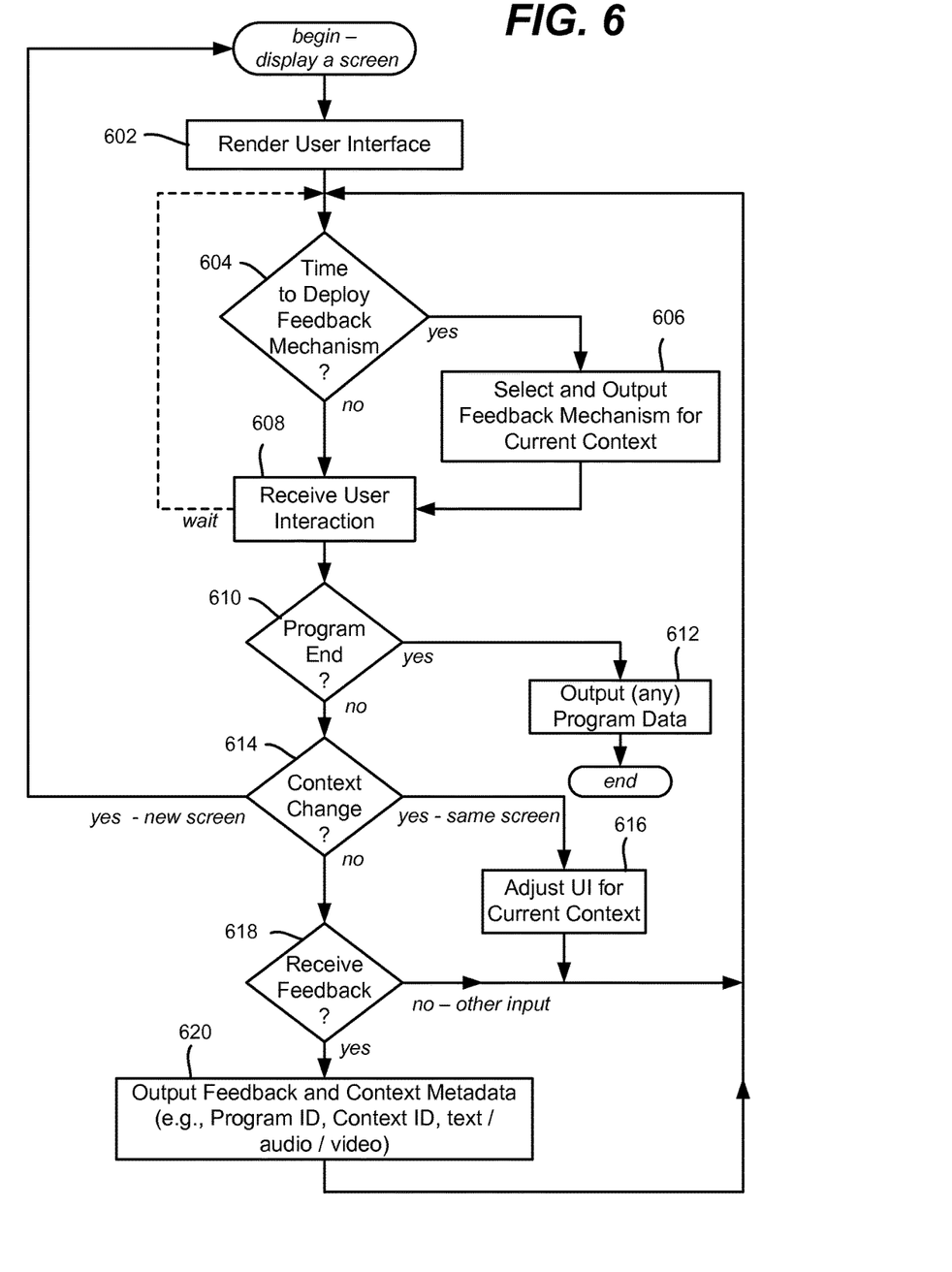
FIG. 6 is a flow diagram showing example steps that may be taken to solicit and collect contextual feedback, according to one or more example embodiments.

FIG. 6 is a flow diagram showing example steps that may be taken to collect contextual feedback during program interaction, beginning at step 602 where program user interface content is rendered. Note that FIG. 6 is only one example set of steps for purpose of explanation, and that many other ways to accomplish the technology described herein may be used.

If it is time to deploy a feedback mechanism as evaluated at step 604, then step 606 is performed to do so; otherwise no feedback mechanism is presented at this time. Note that a feedback mechanism may be immediately rendered as part of the user interface at step 602, such as in the example of FIG. 3 where feedback mechanism 330 is provided for the entire page/screen.

Step 606 represents waiting for some user interaction. Note that if the feedback mechanism is delayed before deployment, steps 604 and 606 may result in the feedback mechanism appearing while waiting for user interaction. Although not explicitly shown, steps 604 and 606 also may vary the appearance, position, animation state and so on of a feedback mechanism over time.

When user interaction is received, step 608 branches to step 610, which in this example tests for whether the program is being ended; if ended, at step 612 the program may output/persist any program data that the user had entered, although the user may elect to exit without saving. Note that many of the steps of FIG. 6 may be in a different order than that exemplified, and/or not all steps need be present, and/or other steps may be included.

If not a program end situation, step 614 evaluates whether the context changed. One way to change context is to move to a new (next or previous) screen (assuming the user is allowed to do so based upon the data entered), which branches back to render the new screen.

Another type of context change is to change context on the same screen, e.g., the user moves to a new control to enter more data. If so, the UI may be adjusted (step 616) for the new current context, e.g. to move a blinking text entry cursor. This allows a change in the feedback mechanism as well, e.g., step 616 returns to step 604.

Another type of interaction is to receive user feedback, as determined via step 618; (other actions represented by the "no" branch, such as requesting help are not shown for purposes of brevity but as can be readily appreciated are appropriately handled). If feedback is received, once the user stops providing feedback and moves on (e.g., clicks elsewhere), step 620 represents outputting (e.g., pushing) the feedback to a data store for immediate or subsequent collection. Note that the user may be prompted before persisting the feedback.

As can be seen, there is provided a service/feature within a graphical user interface (GUI) that allows the user to provide immediate feedback while still in context of performing a specific task or operation within the GUI. This "Just-in-time interactive Feedback" service provides non-intrusive controls throughout the GUI that optionally allows the user to easily provide feedback within the GUI on virtually any task being performed. The feedback triggering mechanism such as a button may include text or the like that helps solicit the feedback.

As the user is performing any given task, this service/feature allows the user to easily make a comment or add some annotations on what he or she trying to do, and at the same time allows for completing tasks uninterrupted. Instead of completing a task and thereafter going to another "user feedback" page to provide comments, a user can provide feedback directly inline as the task is being performed. The service/feature automatically associates the context (e.g., screen and task) with the feedback.

Example Computing Device

The techniques described herein can be applied to any device or set of devices capable of running programs and processes, such as the user device 102 of FIG. 1. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
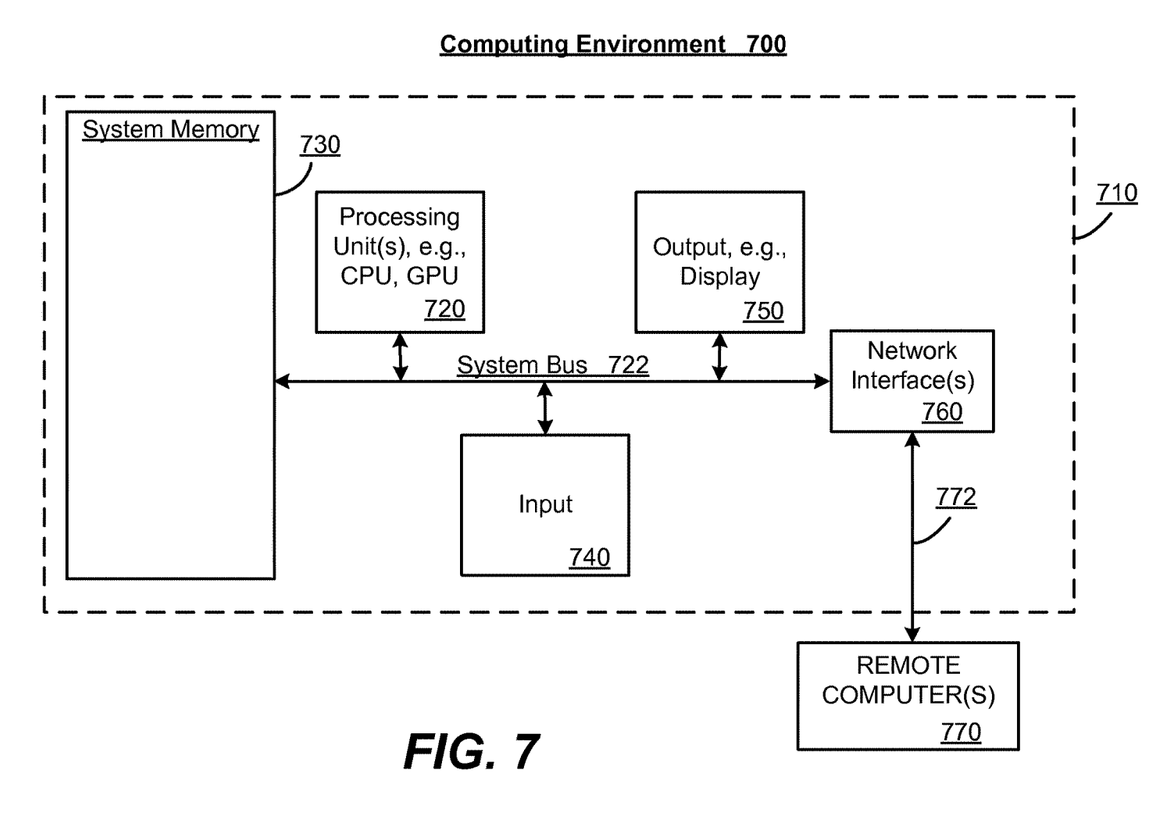
FIG. 7 is a block diagram representing an example computing environment into which aspects of the subject matter described herein may be incorporated.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of machine/computer-readable media and can be any available media that can be accessed by computer 710. The system memory 730 may include computer storage media in the form of volatile and/or nonvolatile memory such as read only memory (ROM) and/or random access memory (RAM), and hard drive media, optical storage media, flash media, and so forth. By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
providing a plurality of interactive feedback mechanisms relative to a user interface component or set of components of a program having one or more user interface screens, providing the plurality of interactive feedback mechanisms further comprising:
rendering a first interactive feedback component for a first program component of the program; and
rendering a second interactive feedback component for a second program component of the program;
detecting actuation of a selected interactive feedback mechanism in the plurality of interactive feedback mechanisms;
presenting a feedback collection mechanism in response to detecting the actuation of the selected interactive feedback mechanism;
collecting contextual feedback from a user while the user is in context of performing a task associated with an input field within a current user interface screen of the program, the feedback collected based upon detecting interaction with the selected interactive feedback mechanism,
the contextual feedback comprising context metadata including metadata that corresponds to where the feedback was collected within the program, the contextual metadata comprising a program identifier and a program context identifier, the program context identifier identifying the selected interactive feedback mechanism in the plurality of interactive feedback mechanisms;
collecting additional metadata comprising a duration of time associated with a user interaction with the current user interface screen of the program; and
persisting the contextual feedback in association with the contextual metadata, the contextual metadata comprising an identifier of the program component associated with the selected interactive feedback mechanism, wherein the identifier of the program component is an identifier of the first program component or an identifier of the second program component.

2. The method of claim 1 wherein providing the plurality of interactive feedback mechanisms further comprises:
rendering the selected interactive feedback mechanism within a graphical user interface component for a program screen, wherein the feedback is provided by the user while the user is still in context of performing a task within the graphical user interface, wherein the user provides the feedback as the task is being performed.

3. The method of claim 2 wherein the program comprises a wizard and wherein persisting the feedback in association with the contextual metadata comprises:
persisting an identifier of the program screen and the program context identifier, wherein the program context identifier identifies a step in the wizard being presented at a time the feedback was entered.

4. The method of claim 1 further comprising:
collecting gesture related input data provided as the feedback by the user, wherein the gesture related input data comprises physical gestures.

5. The method of claim 1, wherein the context metadata comprises an identifier of a control associated with the program component active at a time of feedback entry, and wherein the additional metadata further comprises a duration of user interaction with the control, wherein a long duration of time is indicative of user difficulty with a program component.

6. The method of claim 1, wherein the plurality of interactive feedback mechanisms are provided on a single user interface screen, and further comprising:
rendering a first interactive feedback mechanism associated with a first control for the first program component; and
on detecting a context change on a same screen, rendering a second interactive feedback mechanism associated with a second control for the second program component on, the same screen, wherein the context change comprises user interaction with the second control.

7. The method of claim 1, wherein providing the plurality of interactive feedback mechanisms further comprises:
rendering a representation of an interactive feedback mechanism associated with a program screen after a threshold inactivity delay time before the user enters data associated with the program screen, wherein the interactive feedback mechanism is presented to a user to solicit the feedback after the threshold inactivity delay time.

8. The method of claim 1, wherein providing the plurality of interactive feedback mechanisms further comprises:
rendering a representation of an interactive feedback mechanism in the plurality of interactive feedback mechanism that visibly indicates when the interactive feedback mechanism is active for interaction versus when the feedback mechanism is inactive.

9. The method of claim 1, wherein the contextual metadata corresponds to a context of the program at a current program location where the feedback was collected within the program and further comprising:
processing the feedback and the contextual metadata to analyze the program.

10. A system comprising:
one or more processors and a memory, the memory configured to include a program having one or more user interface screens,
a plurality of interactive feedback mechanisms are provided relative to a set of components of the program, providing the plurality of interactive feedback mechanisms further comprises:
after a threshold inactivity delay time before a user interaction with a given program component on the one or more user interface screens, rendering a selected interactive feedback mechanism for a given program component on a selected user interface screen in the one or more user interface screens, the selected user interface screen having the selected interactive feedback mechanism accessible thereon;

collect feedback via a feedback collection mechanism from a user while the user is in context of performing a task associated with an input field within the selected user interface screen;

the program persisting the feedback and contextual metadata, including metadata that represents a current program context when the selected interactive feedback mechanism is triggered, and the contextual metadata including metadata that corresponds to where the feedback was collected within the program, the contextual metadata comprising a program identifier and a program context identifier, the program context identifier identifying which interactive feedback mechanism in the plurality of interactive feedback mechanisms rendered as the selected interactive feedback mechanism; and persisting the feedback further comprising persisting an identifier of a program component, the identifier of the program component is an identifier of the given program component associated with the selected interactive feedback mechanism.

11. The system of claim 10, wherein the contextual metadata includes at least one of: an interactive control identifier, a software revision/version number, user role data, a customer identifier, license information, timestamp data, system state data, device type data, display type data or duration data.

12. The system of claim 10, wherein the contextual metadata further comprising a duration of time associated with a user interaction with the selected user interface screen.

13. The system of claim 10, wherein contextual feedback collection for a given program is operated according to a mode, wherein the contextual feedback collection is turned on for a first version of the program and wherein the feedback collection is turned off for a second version of the program.

14. The system of claim 10, wherein the plurality of interactive feedback mechanisms are provided on a single user interface screen, and wherein a first interactive feedback mechanism associated with a first control on a first user interface screen for a first program component is rendered; and on detecting a context change, a second interactive feedback mechanism associated with a second control for a second program component is rendered on the first user interface screen, wherein the context change comprises a user interacting with the second control.

15. The system of claim 10, wherein the program includes a plurality of user interface screens, wherein at least two of the user interface screens include an interactive feedback mechanism, and further comprising:

a first user interface screen, wherein a first interactive feedback mechanism for a first input field is rendered on the first user interface screen of the program, wherein the first interactive feedback mechanism is triggered to collect contextual program feedback associated with the first input field, wherein the contextual program feedback collected by the first interactive feedback mechanism is contextually relevant to the data the user is entering or attempting to enter into the first input field; and a second user interface screen, wherein a second interactive feedback mechanism for a second input field is rendered on a second user interface screen of the program on detecting a context change from the first user interface screen to the second user interface screen, wherein the second interactive feedback mechanism is triggered to collect contextual program feedback associated with the second input field, wherein the contextual program feedback collected by the second interactive feedback mechanism is contextually relevant to data the user is entering or attempting to enter into the second input field.

16. The system of claim 10, wherein the feedback collection mechanism is configured to input at least one of: text data, audio data, video data, gesture-related data, checkbox-related data, vote-related data, radio-button related data, graphical data or image data.

17. One or more non-transitory computer-readable memories having machine-executable instructions, which when executed perform steps, comprising, outputting a user interface screen, including outputting a plurality of interactive data entry components of a program, and for each of at least two of the interactive data entry components, providing a plurality of interactive feedback mechanisms, providing the plurality of interactive feedback mechanisms further comprising:

after a first threshold inactivity delay time before user interaction with a first interactive data entry component of the program, outputting a first interactive feedback mechanism for the first interactive data entry component in the plurality of interactive data entry components to prompt feedback from a user, wherein the first interactive feedback mechanism is triggered to collect feedback associated with data the user is entering or attempting to enter into the first interactive data entry component;

after a second threshold inactivity delay time before user interaction with a second interactive data entry component of the program, outputting a second interactive feedback mechanism for the second interactive data entry component in the plurality of interactive data entry components, wherein the second interactive feedback mechanism is triggered to collect feedback associated with data the user is entering or attempting to enter into the second interactive data entry component;

collecting feedback via the first interactive feedback mechanism and the second interactive feedback mechanism; and persisting the feedback in association with feedback metadata including a program identifier and a program context identifier, the program context identifier identifying which interactive feedback mechanism was actuated as the selected interactive feedback mechanism, and persisting the feedback further comprises persisting an identifier of a program component, the identifier of the program component is an identifier of the first interactive data entry component or an identifier of the second interactive data entry component.

18. The computer-readable memories of claim 17 having further machine-executable instructions comprising:

using the feedback and the feedback metadata to modify the program or as part of development of a new program.

19. The computer-readable memories of claim 17, wherein outputting a selected interactive feedback mechanism for at least one of the plurality of interactive data entry components comprises:

rendering a visible representation of the selected interactive feedback mechanism, the visible representation comprising at least one of: a button, an icon, a hovering link, or a menu selection or sub-selection, wherein the selected interactive feedback mechanism changes as time increases without user interaction with a given interactive data entry component to vary a position of the selected interactive feedback mechanism over time.

20. The computer-readable memories of claim 17 wherein outputting a selected interactive feedback mechanism for at least one of the plurality of interactive data entry components comprises further comprising:

rendering a visible representation of the selected interactive feedback mechanism in the plurality of interactive feedback mechanisms after the threshold inactivity delay time, wherein the selected interactive feedback mechanism changes as time increases without user interaction with a given interactive data entry component to vary an animation state of the selected interactive feedback mechanism over time.

* * * * *